Dec. 22, 1931.  A. DINA  1,837,705
SPEEDOMETER MOUNTING AND ADJUSTMENT FOR
MOTION PICTURE PROJECTION MACHINES
Filed June 29, 1929  2 Sheets-Sheet 1
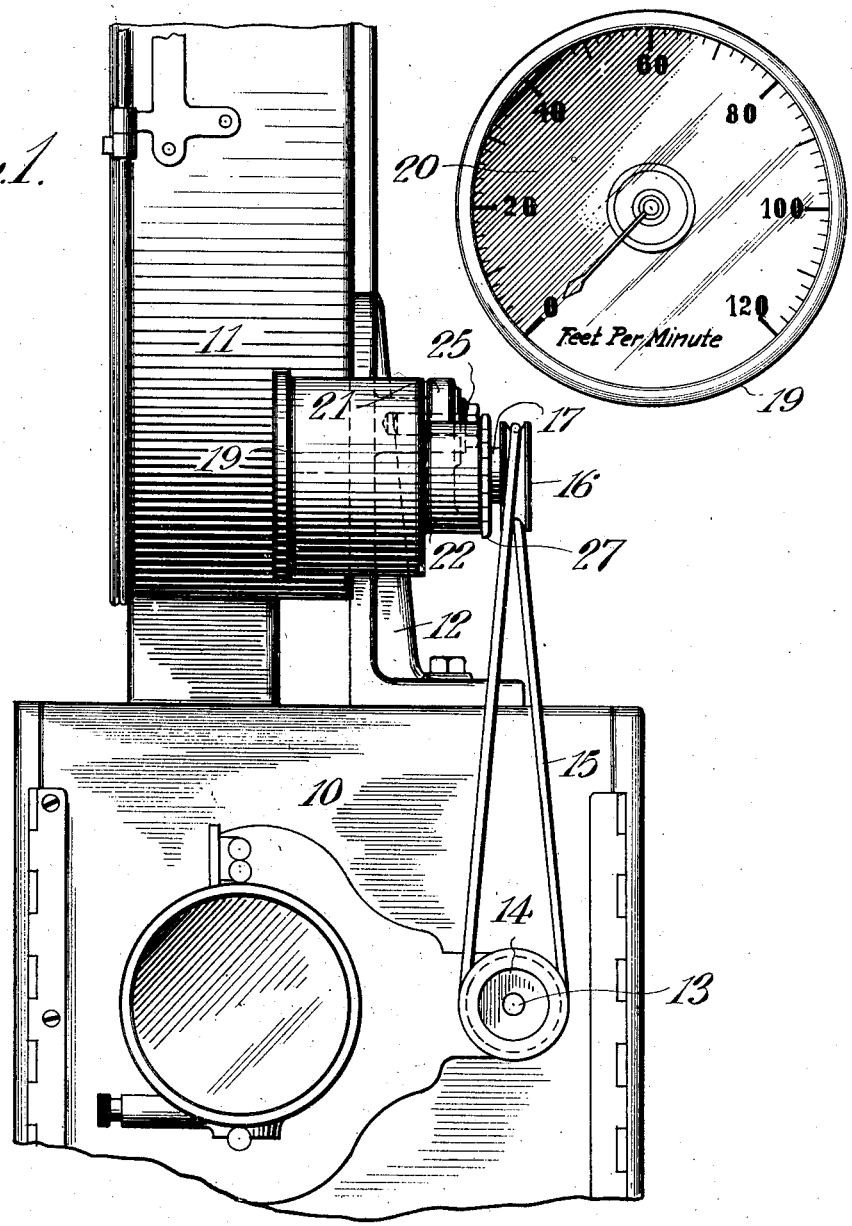
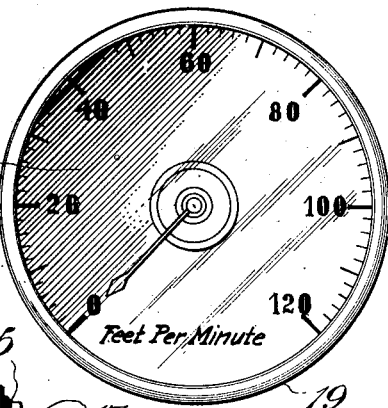
INVENTOR
Augusto Dina
BY
Howard W. D.
ATTORNEY

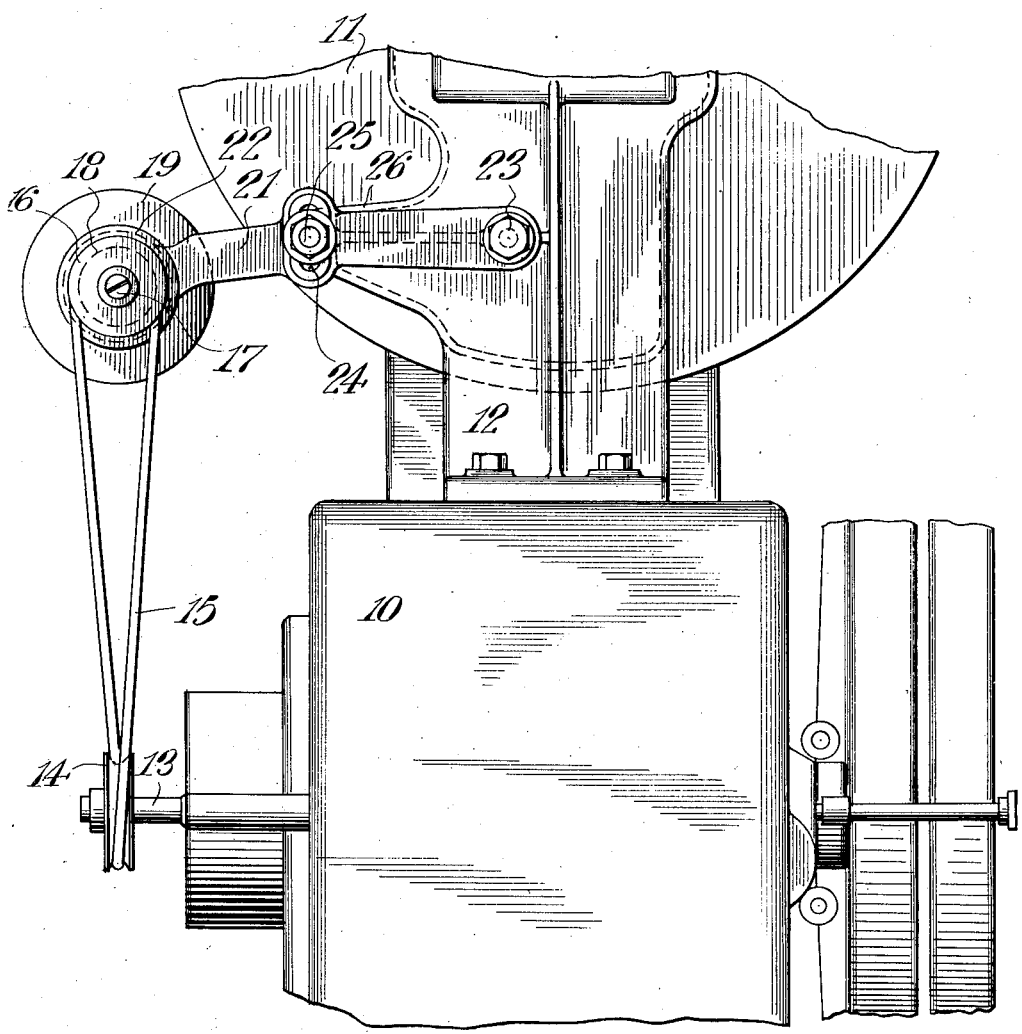

Patented Dec. 22, 1931

1,837,705

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

SPEEDOMETER MOUNTING AND ADJUSTMENT FOR MOTION PICTURE PROJECTION MACHINES

Application filed June 29, 1929. Serial No. 374,738.

This invention relates to motion picture apparatus and has especial reference to a new and improved mounting and adjustment for speedometers used for indicating the speed at which the film is being moved through the machine.

A main object of the invention is to provide a simple, compact, rugged, and efficient device whereby the speedometer is disposed in the most convenient location on the machine for observation by the operator and may be regulated and adjusted with the utmost ease and dispatch so as to be at all times a true indication of the film movement.

Further and more specific objects, features, and advantages will more clearly appear from the detailed description given below when taken in connection with the accompanying drawings which illustrate one embodiment of the invention and form part of the specification, and in which, Fig. 1 is an end elevation of a motion picture projector with the speedometer in place and mounted and adjustable in accordance with this invention;

Fig. 2 is a side elevation of the machine and device illustrated in Fig. 1; and, Fig. 3 is a front view of the face of the speedometer.

As shown in the drawings, the present preferred form of the invention is adapted to be attached to a motion picture machine. In the case illustrated a projector includes a projecting head 10 and an upper film magazine 11 which is supported from the head 10 on a frame 12. Extending from the head is one end of the shutter shaft 13 which is provided with a pulley 14. Engaging the pulley 14 is a belt or other flexible connection 15. This belt 15 extends to and passes around another pulley 16 fixed to the end of a speedometer shaft 17. This shaft extends through a bushing 18 fastened to the rear face of a speedometer casing 19. The front face of the speedometer is provided with a dial 20 calibrated in terms of feet per minute speeds of the film past the film aperture opening.

The speedometer may be supported in any desired position relative to the head 10 or to the magazine 11. The main governing factors in suitably placing the speedometer are, the accessibility to the shutter shaft 13, and a location which permits ready observation by the operator.

The mounting or supporting of the speedometer is to be made adjustable so as to readily permit take ups for wear or stretching of the driving belt 15.

The preferred and satisfactory mounting is fully illustrated in Fig. 2, the use is made of an arm 21 provided with a collar 22 at or near its left end. This collar receives the bushing 18 and this supports the speedometer. The right hand end of the arm 21 is preferably pivoted to frame 12, by means of a suitable bolt 23. Any suitable means may be employed to hold the arm 21 after it has been properly pivoted about the bolt 23. Preferably intermediate its ends, the arm 21 is provided with a slot 24 transversely of the arm and through which extends a bolt 25 fastened to a lateral wing 26 on the frame 12. By loosening the bolt 25 the arm 22 may be moved up and down to regulate the tension in the belt 15 after which the bolt 25 may be tightened.

Often it may be desirable to drive the speedometer by a quiet running chain thereby giving an absolutely correct indication of the revolutions per minute and to accomplish the same without additional noise. Gear 27 is mounted beside pulley 16 for receiving such a chain.

From a consideration of the drawings, it is obvious that the speedometer may be observed easily from the side of the machine on which the operator usually stands. Also the adjustment of the belt tension can be readily and easily made without the expenditure of more than a few seconds time. This adjustment generally will be required only occasionally. By having the speedometer and its adjusting mechanism up at the front of the machine, it is out of the way and there is no likelihood of interfering with the greater number of moving parts and mechanism which usually lies between the head and the lamp house of the machine at the back of the head.

While the invention has been described in detail and with respect to a preferred form thereof, it is to be understood that it is not to be limited to such details and forms since many changes and modifications may be made and the invention embodied in other forms without departing from the spirit and scope of the invention in its broader aspects. Hence it is desired to cover all forms and modifications coming within the language of scope of any one or more of the appended claims.

What is claimed is:

1. In combination with a motion picture machine, a projection head, an upper film magazine, a speedometer disposed adjacent said magazine, a driving shaft projecting from said head, a connection from the driving shaft to the speedometer, a support for the speedometer, and means for adjusting the support to vary the tension in the driving connection.

2. In combination with a motion picture machine, a projection head, an upper film magazine, a speedometer disposed adjacent said magazine, a driving shaft projecting from said head, a belt extending from the driving shaft to the speedometer, an arm connected to the machine and supporting the speedometer, and means for allowing the adjusting and for fastening the arm after the tension in the belt has been varied.

3. In combination with a motion picture machine, a projection head, an upper film magazine, a speedometer disposed adjacent said magazine, a driving shaft projecting from said head, a belt extending from the driving shaft to the speedometer, an arm pivotally connected to the machine and supporting the speedometer, said arm having a slot therein, and adjustable means on the machine and extending through said slot to permit the adjustment of the arm to vary the tension of the belt.

4. In combination with a motion picture machine, a projection head, an upper film magazine, a speedometer disposed adjacent said magazine, a driving shaft projecting from said head, a belt extending from the driving shaft to the speedometer, an arm pivotally connected to the machine and supporting the speedometer, said arm having a transverse slot therein, an adjustable bolt on the machine and extending through said slot to permit the adjustment of the arm and to tighten it in an adjusted positon whereby the tension of the belt may be regulated.

5. In combination with a motion picture machine, a speedometer, a projection head, an upper film magazine, a frame on said head supporting said magazine, a driving shaft projecting from said head, a belt extending from the driving shaft to the speedometer, an arm pivotally connected to said frame and supporting the speedometer, said arm having a transverse slot therein, an adjustable bolt on the frame and extending through said slot to permit the adjustment of the arm and to tighten it in an adjusted position whereby the tension of the belt may be regulated.

6. In combination with a motion picture machine, a speedometer, a projection head, an upper film magazine, a frame on the head supporting said magazine, a driving shaft projecting from said head, a belt extending from the driving shaft to the speedometer, an arm pivotally connected to said frame and supporting the speedometer with the dial thereof facing towards the operator's side of the machine, said arm having a transverse slot therein, a bolt carried by said frame and extending through said slot to permit the adjustment of the arm and to tighten it in an adjusted position whereby the tension of the belt may be regulated.

AUGUSTO DINA.